United States Patent
Leef et al.

(10) Patent No.: US 7,502,992 B2
(45) Date of Patent: Mar. 10, 2009

(54) METHOD AND APPARATUS FOR DETECTING PRESENCE OF ERRORS IN DATA TRANSMITTED BETWEEN COMPONENTS IN A DATA STORAGE SYSTEM USING AN I2C PROTOCOL

(75) Inventors: Phillip Leef, Brookline, MA (US); Douglas Sullivan, Hopkinton, MA (US); Stephen Strickland, Marlboro, MA (US); Alex Sanville, Chelmsford, MA (US)

(73) Assignee: EMC Corporation, Hopkinton, MA (US)

( * ) Notice: Subject to any disclaimer, the term of this patent is extended or adjusted under 35 U.S.C. 154(b) by 336 days.

(21) Appl. No.: 11/394,919

(22) Filed: Mar. 31, 2006

(65) Prior Publication Data

US 2007/0234136 A1 Oct. 4, 2007

(51) Int. Cl.
G06F 11/00 (2006.01)
G01R 31/28 (2006.01)

(52) U.S. Cl. ...................... 714/807; 714/736
(58) Field of Classification Search ................. 714/712, 714/715, 819, 746, 748, 760, 776, 799, 48, 714/43, 39, 807, 704
See application file for complete search history.

(56) References Cited

U.S. PATENT DOCUMENTS

| | | | |
|---|---|---|---|
| 5,283,792 A | 2/1994 | Davies et al. | 714/22 |
| 5,774,640 A | 6/1998 | Kurio et al. | 714/4 |
| 5,935,261 A * | 8/1999 | Blachek et al. | 714/42 |
| 6,633,905 B1 | 10/2003 | Anderson et al. | 709/219 |
| 6,678,639 B2 | 1/2004 | Little et al. | 702/188 |
| 6,681,282 B1 | 1/2004 | Golden et al. | 710/302 |
| 6,728,908 B1 | 4/2004 | Fukuhara et al. | 714/48 |
| 6,873,268 B2 | 3/2005 | Lebel et al. | 340/870.16 |
| 6,910,148 B1 | 6/2005 | Ho et al. | 714/4 |
| 7,039,737 B1 | 5/2006 | Dorr et al. | 710/240 |
| 2005/0154841 A1 * | 7/2005 | Sastri et al. | 711/148 |

OTHER PUBLICATIONS

Data Sheet: EMC Clariion CX Series, EMC Corporation, 2004, 8 pages.
http://www.storagesearch.com/fchub.html, "The Shift to NAS Gateways," visited Aug. 17, 2006, 4 pages.

* cited by examiner

*Primary Examiner*—Phung M Chung
(74) *Attorney, Agent, or Firm*—BainwoodHuang

(57) ABSTRACT

A data storage system includes a storage processor that is configured to perform load and store operations on a storage array on behalf of external devices. The data storage system also includes a controller that isolates communication between the external devices when coupled to the storage array via the storage processor. The controller further maintains a set of registers that store information associated with the data storage system and allows the storage processor to access the register via an I2C bus. The system utilizes an error detection procedure to allow detection of errors in the data transmitted between the controller and the storage processor. During operation, a checksum value is transmitted between the controller and the storage processor using the I2C bus during a register write or read procedure. The controller and the storage processor utilize the checksum value in an error detection procedure to detect the data errors resulting in transmission of the data by the I2C bus.

18 Claims, 9 Drawing Sheets

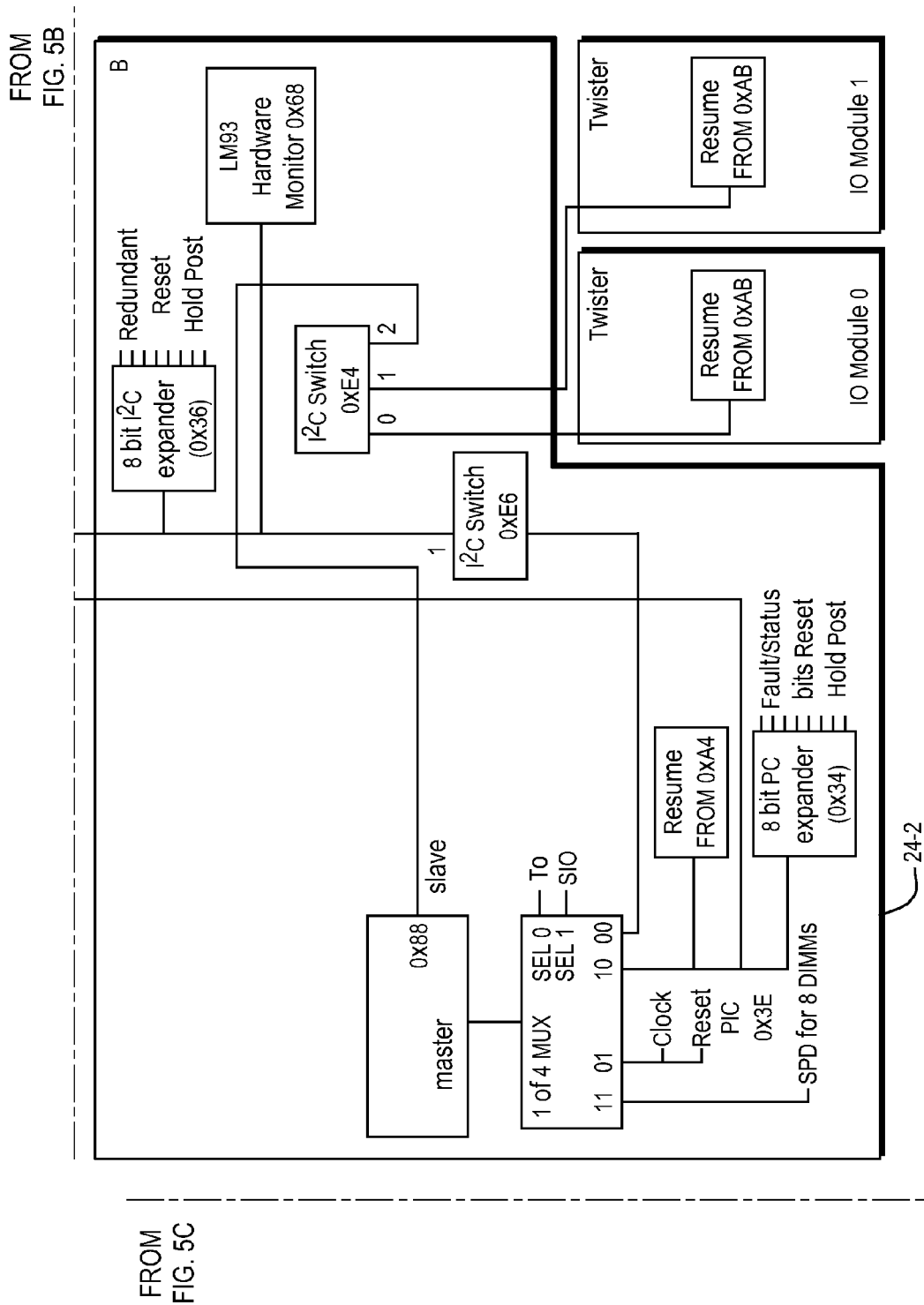

METHOD AND APPARATUS FOR DETECTING PRESENCE OF ERRORS IN DATA TRANSMITTED BETWEEN COMPONENTS IN A DATA STORAGE SYSTEM USING AN I2C PROTOCOL

CROSS REFERENCE TO RELATED APPLICATIONS

This application is related to U.S. Patent Application No. 11/394,943. filed on even date herewith, entitled "METHOD AND APPARATUS FOR PROVIDING A LOGICAL SEPARATION OF A CUSTOMER DEVICE AND A SERVICE DEVICE CONNECTED TO A DATA STORAGE SYSTEM", the contents and teachings of which are hereby incorporated by reference in their entirety.

BACKGROUND

A typical data storage system stores and retrieves data for one or more external host devices (or simply hosts). Such a data storage system typically includes processing circuitry and a set of disk drives. In general, the processing circuitry performs load and store operations on the set of disk drives on behalf of the hosts.

The processing circuitry of the data storage system includes multiple processors used to control the operation of various functions of the system. The processors utilize an I2C protocol or bus, designed by Philips Semiconductors to communicate with each other and exchange information regarding the status or functioning of the data communications system.

SUMMARY

Unfortunately, there are deficiencies in the use of the conventional I2C protocol with certain data storage systems. For example, the standard I2C bus protocol does not provide fault tolerance for data transmitted between processors in the storage system over the I2C bus. Certain data storage systems, such as the data storage system described in the U.S. Patent Application entitled "Method and Apparatus for Providing a Logical Separation of a Customer Device and a Service Device Connected to a Data Storage System", Ser. No. 11/394,943,herein incorporated by reference in its entirety, utilize the I2C protocol among components in the system. For example, the reference data storage system includes a storage processor that is configured to perform load and store operations on a storage array on behalf of external devices. The data storage system also includes a controller that isolates communication between the external devices when coupled to the storage array via the storage processor. The controller further maintains a set of registers that store status and fault information associated with the data storage system and allows the storage processor to access the register via an I2C bus. However, the I2C bus can create errors in the data exchanged between the controller and the storage processor For example, during data transmission between the controller and the storage processor, the I2C bus can inadvertently flip bits in the data (e.g., change a bit in the data from a value of "0" to "1" or vice versa). As such, either the controller or the storage processor can receive incorrect data. Because the I2C protocol used in the data storage system does not include an error checking mechanism, there is no way for either the controller or the storage processor to check the data to ensure that the data was transmitted or received without errors.

By contrast to the conventional use of the I2C protocol, embodiments of the invention are directed to techniques for detecting the presence of errors in data transmitted between components in a data storage system using the I2C protocol. As described above, the data storage system includes a storage processor that is configured to perform load and store operations on a storage array on behalf of external devices. The data storage system also includes a communications management device having a controller that isolates communication between the external devices when coupled to the storage array via the storage processor. The controller further maintains a set of registers that store status and fault information associated with the data storage system and allows the storage processor to access the register via an I2C bus. In order to allow detection of errors in the data transmitted between the controller and the storage processor as caused by the I2C bus, the system utilizes an error detection procedure. For example, during operation, a checksum value is transmitted between the controller and storage processor using the I2C bus during a register write or read procedure. The controller and the storage processor utilize the checksum value during error detection procedure to detect the presence or absence of data errors resulting in transmission of the data by the I2C bus. The use of the checksum allows error checking of data transmitted using the existing I2C protocol in the data storage system without requiring additional components (e.g., processors, etc.) to be incorporated therein.

One embodiment of the invention relates to, in a storage processor of a data storage system, a method for detecting a transmission error for data transferred over an I2C bus between the storage processor and a controller of the data storage system during a data read procedure. The method includes transmitting a data request signal to the controller over the I2C bus to request data from the controller and receiving a data response signal from the controller over the I2C bus in response to the data request signal. The method further includes performing an error detection procedure on the data response signal to form a validation result and comparing the validation result with a validation threshold. The method also includes detecting (i) that the data response signal does not include errors caused by the I2C bus in the case where the comparison between the validation result and the validation threshold produces a first comparison result and (ii) that the data reply signal does include errors caused by the I2C bus in the case where the comparison between the validation result and the validation threshold produces a second comparison result. Therefore, the data storage system allows error checking of data transmitted using the I2C protocol without requiring additional components (e.g., processors, caches, etc.) to be incorporated into the system. The use of the error detection procedure described, in conjunction with the I2C protocol, does not add an additional expense to the system to provide data error checking and ensure data integrity.

In one arrangement, a storage processor of a data storage system having a controller and I2C bus configured to provide communication between the storage processor and the controller is configured to transmit a data request signal to the controller over the I2C bus to request data from the controller and receive a data response signal from the controller over the I2C bus in response to the data request signal. The storage processor is also configured to perform an error detection procedure on the data response signal to form a validation result and compare the validation result with a validation threshold. The storage processor is also configured to detect (i) that the data response signal does not include errors caused by the I2C bus in the case where the comparison between the validation result and the validation threshold produces a first comparison result and (ii) that the data reply signal does include errors caused by the I2C bus in the case where the comparison between the validation result and the validation threshold produces a second comparison result.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A-5D illustrates another schematic representation of a data storage system, according to one embodiment of the invention.

DETAILED DESCRIPTION

Embodiments of the invention are directed to techniques for detecting the presence of errors in data transmitted between components in a data storage system using, a low speed serial protocol, such as an I2C protocol. The data storage system includes a storage processor that is configured to perform load and store operations on a storage array on behalf of external devices. The data storage system also includes a communications management device having a controller that isolates communication between the external devices when coupled to the storage array via the storage processor. The controller further maintains a set of registers that store status and fault information associated with the data storage system and allows the storage processor to access the register via an I2C bus. In order to allow detection of errors in the data transmitted between the controller and the storage processor as caused by the I2C bus, the system utilizes an error detection procedure. For example, during operation, a checksum value is transmitted between the controller and storage processor using the I2C bus during a register write or read procedure. The controller and the storage processor utilize the checksum value during error detection procedure to detect the presence or absence of data errors resulting in transmission of the data by the I2C bus. The use of the checksum allows error checking of data transmitted using the existing I2C protocol in the data storage system without requiring additional components (e.g., processors, etc.) to be incorporated therein.

Figure 1:
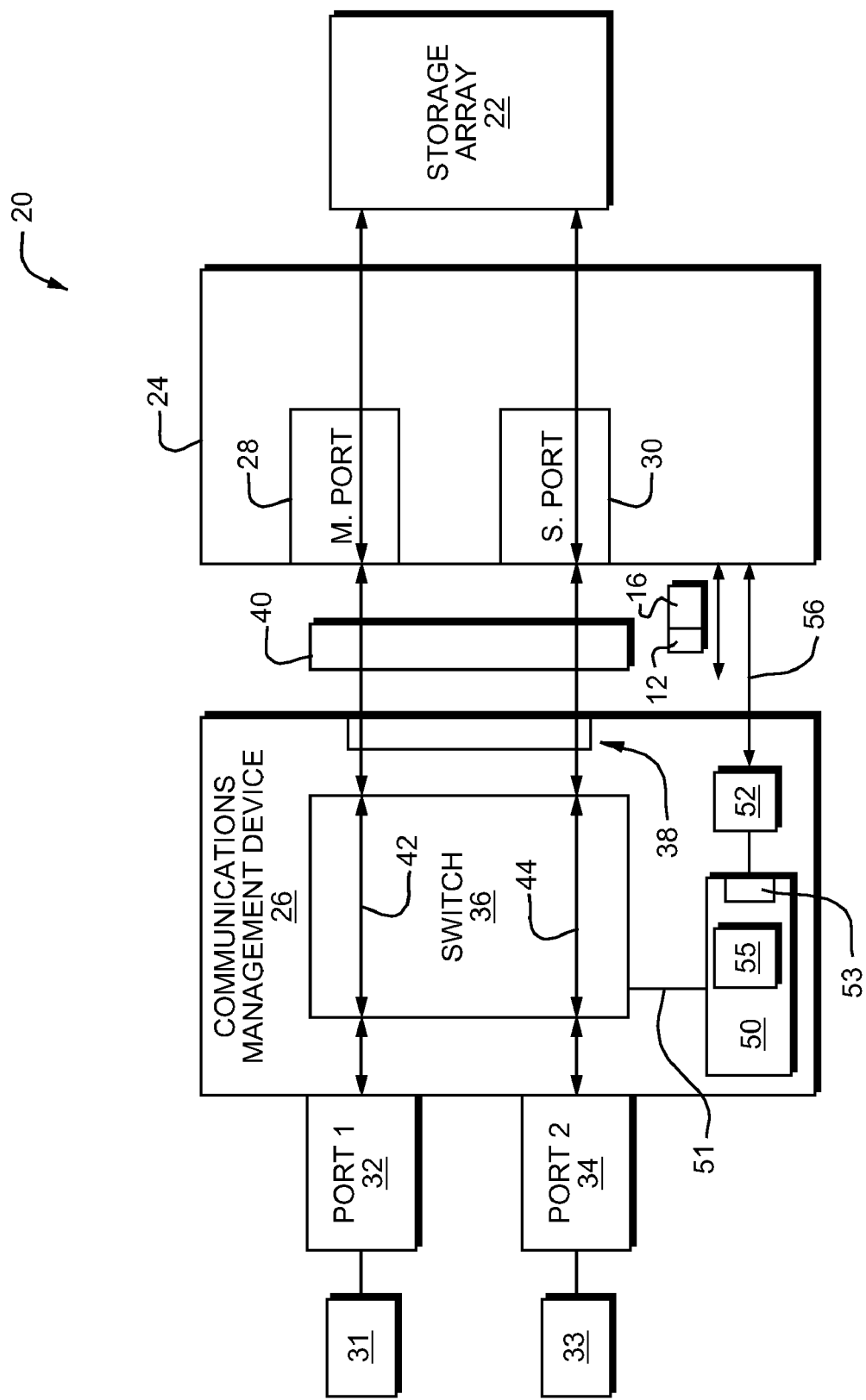
FIG. 1 illustrates a schematic representation of a data storage system, according to one embodiment of the invention.

FIG. 1 illustrates an arrangement of a data storage system 20. The system 20 includes a data storage array 22 (e.g., a configuration of magnetic disk drives) having a storage processor 24 and a communications management device 26 coupled to the storage processor 24. The storage array 22 is configured to store and retrieve data for one or more external devices.

The storage processor 24 is configured to perform load and store operations on the storage array 22 on behalf of the external devices. The storage processor 24 is also configured to provide the external devices, such as user devices 31 and service devices 33, access to the storage array 22. In one arrangement, the storage processor 24 includes a management port 28 and a service port 30. In use, a user device 31 utilizes the management port 28 to load and store data relative to the storage array 22 while a service device 33 utilizes the storage port 30 to diagnose and service the storage array 22.

The communications management device 26 is configured to isolate interaction or communication between the user and service devices 31, 33 when coupled to the storage array 22. In one arrangement, the communications management device 26 includes a first port 32, a second port 34, a controller 50, and a switch 36 electrically coupled to the first and second ports 32, 34. In one arrangement, each of the ports 32, 34 is configured as an Ethernet port, such as an RJ45 port, to allow connection of a user device or network 31 and a service device or network 33 to the communications management device 26 using a cable, such as a twisted-pair Ethernet cable.

The switch 36, such as a Broadcom 532E 10/100Base-T/TX Ethernet switch is configured to electrically couple the ports 32, 34 of the device 26 to the ports 28, 30 of the storage processor 24 through an electrical connection 38. For example, the communications management device 26 can include a midplane connector 38, such as a Metral series connector distributed by FCI (FCI, France), that couples to the storage processor 24 through a midplane 40. In such an arrangement, the communications management device 26 is configured as a field replaceable unit (FRU) that can be electrically coupled to, or decoupled from, the storage array 22.

The controller 50 electrically coupled to the switch 36 via interface 51, such as a four-wire serial peripheral interface (SPI). The controller 50 is operable to perform configuration and diagnostics operations with respect to the switch 36. In one arrangement, the controller 50 is a Cypress Microcontroller model number CY8C27443, distributed by Cypress Semiconductor Corporation. The controller 50 includes an I2C interface 49 to allow communication with components of the system 20 using an I2C protocol. In one arrangement, the interface 53 allows the controller 50 to communicate with the storage processor 24 over an I2C bus 56. The controller 50 is operable to configure a virtual local area network (VLAN) associated with the switch 36 to create various network topologies within the system 20 in order to isolate separate communications paths 42, 44 between the ports 32, 34 and different computerized devices or networks 31, 33 coupled thereto.

Also as illustrated, the controller 50 includes an I2C switch (e.g., isolation module) 52, such as a Philips PCA9546 I2C switch, distributed by Philips Semiconductors, that is configured to isolate the controller 50 from the bus 56, such as in the event that the controller 50 holds ether the data or clock lines low. In another arrangement, the I2C switch 52 is operable to allow two controllers with the same address to communicate with the storage processor on the bus. For example, as indicated in FIGS. 5A-5D, and as will be explained below, the system 20 can include two distinct communications management devices 26-1, 26-2, each of which being coupled to two storage processors 24-1, 24-2 via I2C busses 56-1, 56-2. As indicated, the controllers 50-1, 50-2 of the communications management devices 26-1, 26-2 have the same address (e.g., 0x90). Each I2C switch 52-1, 52-2 is configured to disconnect its associated controller 50-1, 50-2 from the respective bus 56-1, 56-2 when the other controller 50-1, 50-2 receives communications from a master device (e.g., the storage processor 24). For example, when the first controller 50-1 receives communications from the storage processor 24-1, the second I2C switch 52-2 disconnects the second controller 50-2 from the I2C bus 56-2 in order to minimize or prevent address conflict errors within the system 20.

Returning to FIG. 1, the controller 50 maintains a set of registers 55 that store status and fault information associated with the communications management device 26. In one arrangement, the controller 50 maintains a set of seven registers, each register having a corresponding register address. For example, as shown in Table 1 provided in the Appendix, as part of the set of registers 55, the controller 50 maintains a reserved register 100 (e.g., reserved for future use), a system register 102, a fault register 104, first and second port status registers 106, 108, a manufacturing mode register 110, a boot block revision register 112, and a configuration revision register 114. The system register 102 is configured to hold information relating to the configuration, manufacturing mode, and fault status of the communications management device 26. The fault register 104 is configured to hold status information regarding the cause of the fault bit being set in the status register. The first and second port status registers 106, 108 contain information relating to port speed, link status, duplex mode, and autonegotiation settings associated with the ports 32, 34. The manufacturing mode register 110 is configured to receive instructions that cause the controller 50 to activate or deactivate a fault indicator, such as an LED, associated with the communications management device 26. The boot block revision register 112 and the configuration revision register 114 contain the version information related to the controller 50.

The register 55 stores information as data bytes (e.g. eight bit blocks). With reference to Table 2 in the Appendix, the system register 102, for example stores data as a series of eight bits. For example, the system register includes a reserved bit 120, a slot identification bit 122, manufacturing modification bits 124, 126, a fault state bit 128, and a set of switch configuration mode bits 130. Each bit represents a portion of the status information regarding the system 20. For example, the fault state bit 128 is configured to indicate a fault/no fault state of the controller 50. When the bit 128 is set to "0", the bit indicates a no fault state of the controller 50 and when the bit 128 is set to "1", the bit indicates a fault state of the controller 50.

Various devices associated with the system 20 can write data to or read data from the registers 55 using a low speed serial protocol, such as an I2C protocol or bus 56. For example, as indicated in FIG. 1, the storage processor 24 is configured to write data 12 to, and read data 12 from, the register 55. Additionally, while a single storage processor 24 is illustrated as communicating with the controller 50 over the I2C bus 56, one of ordinary skill in the art will understand that any number of storage processors 24 associated with the system 20 can communicate with the controller 50 to read from or write to the registers 55. For example, as illustrated in FIGS. 5A-5D, the system 20 can include two storage processors 24-1, 24-2 coupled to controllers 50-1, 50-2 via I2C busses 56-1, 56-2.

Returning to FIG. 1, as indicated above, the storage processor 24 (e.g., master device) in the system 20 communicate with the controller 50 over the I2C bus 56 to read data from and write data to the register 55. However, with the conventional I2C bus 56, data transmission errors, such as "bit flipping", can occur during read or write procedures and can be undetected.

For example, assume the case where the storage processor 24 reads data from the system register 102 and the fault bit 128 is set to "0". In the case of a bit flipping error, during transmission over the I2C bus 56, assume the value of the bit 128 is inadvertently switched from the value "0" to the value "1". When the storage processor 24 receives the data from the system register 102 using the conventional I2C bus 56, the storage processor 24 cannot detect that the bit value of the fault bit 128 had been changed during transmission. Therefore, the storage processor 24 detects a fault state in the controller 50 and, as a result, can execute a series of steps in an attempt to correct the non-existent fault or to prove the validity of the fault. For example, the storage processor 24 can implement a confirmation protocol requiring the storage processor 24 to re-read the data from the system register at least another two or three times to detect the validity of the fault. Execution of such a protocol causes the storage processor 24 to take a relatively long period of time to identify a fault.

In order to allow detection of errors in the data transmitted between the controller 50 and the storage processor 24 as caused by the I2C bus 56, such as the presence of "flipped bits," either during a write or read procedure, the system 20 utilizes an error detection procedure in conjunction with the existing I2C bus 56. In one arrangement, a checksum value or signal 16 is transmitted using the I2C bus 56 during a register write or read procedure, as described below with respect to FIGS. 2 and 3. The controller 50 and the storage processor 24 utilize the checksum value 16 during error detection procedure to detect whether the data transmitted or received via the I2C bus 56 includes errors or does not include errors as a result of the transmission.

Figure 2:
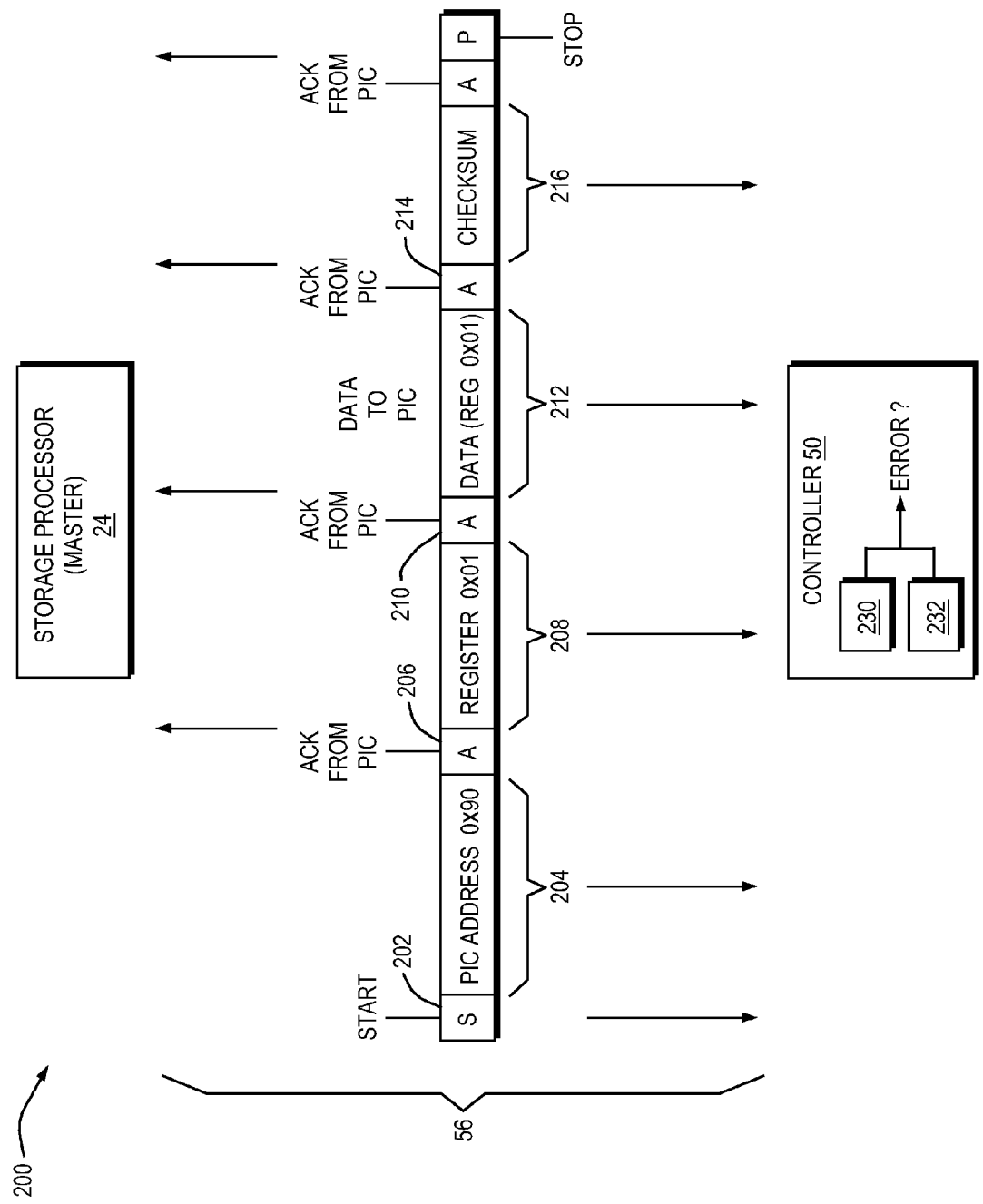
FIG. 2 illustrates a series of signals transmitted between a master device and a slave device in the data storage system of FIG. 1 during a data write procedure, according to one embodiment of the invention.

FIG. 2 illustrates a series of signals 200 transmitted using the I2C bus 56, between the storage processor 24, and the controller 50 (e.g., slave device) during a data write procedure. The storage processor 24 initially transmits a start signal or bit 202 and a controller address signal or byte 204 to the controller 50 to establish communications with the controller 50. In response, the controller 50 transmits an acknowledgement bit 206 to the storage processor 24 to acknowledge reception of the address byte 204. The storage processor 24 then transmits a data transmission signal to the controller 50 to initiate writing of data to the controller 50. In one arrangement, the storage processor transmits a register address request signal or byte 208 that indicates the register to which the storage processor 24 is writing. For example, as illustrated, the storage processor 24 transmits a register address request byte 208 indicating that the data to be provided to the controller 50 should be written to register 0x01 (e.g., shown in Table 1 as the system register 102). The controller 50 transmits, in response, an acknowledgement bit 210. Upon reception of the acknowledgement bit 210, the storage processor 24 transmits a data signal or data byte 212 to the register 102 and the controller 50 provides an acknowledgement bit 214 in return. In one arrangement, during the data write procedure, the storage processor 24 transmits a configuration characteristic signal to the controller 50 as the data signal. The configuration characteristic 58 indicates a particular configuration of the storage array 22. For example, the storage array 22 can be configured as a storage area network (SAN) or can be configured to include a network attached storage (NAS) device, such as a gateway or a server, which forms a front-end to the storage array 22. The configuration characteristic signal allows the controller 50 to detect the "type" of storage array 22 to which it is connected and allows the controller 50 to configure the switch 51 to provide certain communication pathways 42, 44 between the first and second ports 32, 34 of the communications management device 26 and the management and service ports 28, 30 of the storage processor 24 based upon the storage array "type."

Next, the storage processor 24 transmits a checksum signal or byte 216 to the controller 50. In one arrangement, the storage processor 24 calculates the checksum byte 216 prior to transmission to the controller 50. While the checksum byte 216 can be calculated in a number of ways, in one arrangement, the storage processor 24 calculates the checksum byte 216 using the following checksum calculation algorithm. The storage processor 24 first adds a hexadecimal value of the register address request byte 208 and a hexadecimal value of the data byte 212. The storage processor 24 then performs an exclusive OR, (e.g., XOR) function between the resultant sum and the hexadecimal value "0xFF" to form an intermediary result. The storage processor 24 then adds the value "1" to the intermediary result to generate the checksum byte 216.

Once the controller 50 receives the checksum byte 216, the controller 50 utilizes the checksum byte 216 to engage in an error detection procedure to detect the presence of errors in the data byte 212 caused during transmission via the I2C bus 56. For example, the controller 50 first adds the checksum byte 216, the register address request byte 208, and the data byte 212 to form a resultant sum. The controller 50 then performs a modular division between the resultant sum and a denominator value such as the value "256" to form a validation result 230. The controller 50 then compares the validation result 230 to a validation threshold 232 to detect errors in the data byte 212. In one arrangement, the validation threshold 232 is set to the value 0x0A. In the case where the validation result 230 is equal to the validation threshold 232 (e.g., the validation result 230 is equal to the value 0x0A), the controller 50 detects that the data byte 212 transmitted from the storage processor 24 via the I2C bus 56 has been received without errors (e.g., no flipped bits occurring in the data byte 212). For example, assume the case where the data signal is a configuration characteristic signal. As a result of the signal being received without errors, the controller 50, in response, can configure the switch 51 to provide communication pathways 42, 44 between the first and second ports 32, 34 of the communications management device 26, corresponding to the storage array "type" indicated by the signal. In the case where the validation result 230 is not equal to the validation threshold 232 (e.g., the validation result 230 is not equal to the value 0x0A), the controller 50 detects that the data byte 212 transmitted from the storage processor 24 via the I2C bus 56 has been received with errors (e.g., flipped bits occurring in the data byte 212). As a result of such detection, in one arrangement, the control 50 can generate a signal to either warn a user of the detected error or to cause the storage processor 24 to retransmit the data byte 212 to the controller 50.

Figure 3:
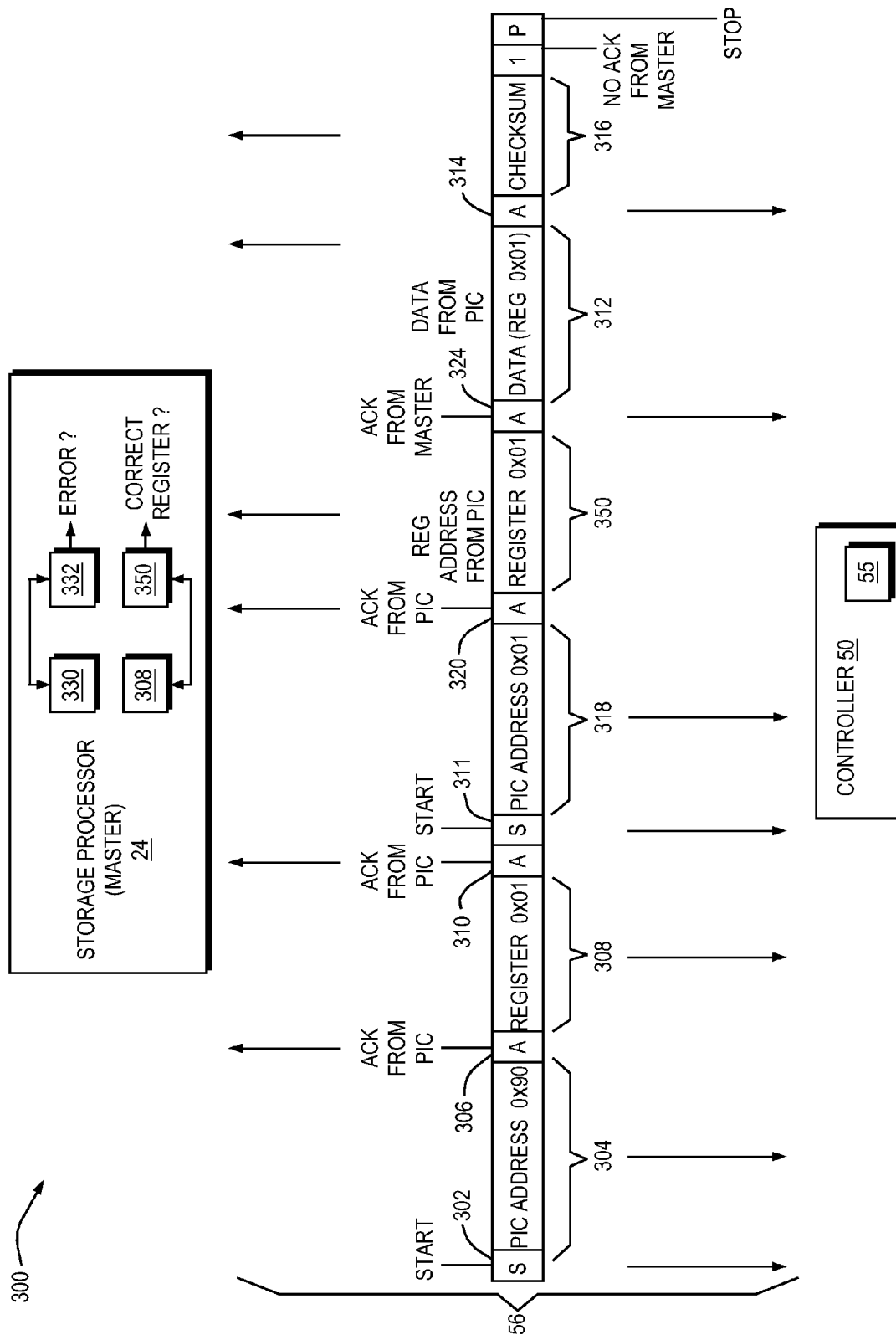
FIG. 3 illustrates a series of signals transmitted between a master device and a slave device in the data storage system of FIG. 1 during a data read procedure, according to one embodiment of the invention.
Figure 6:
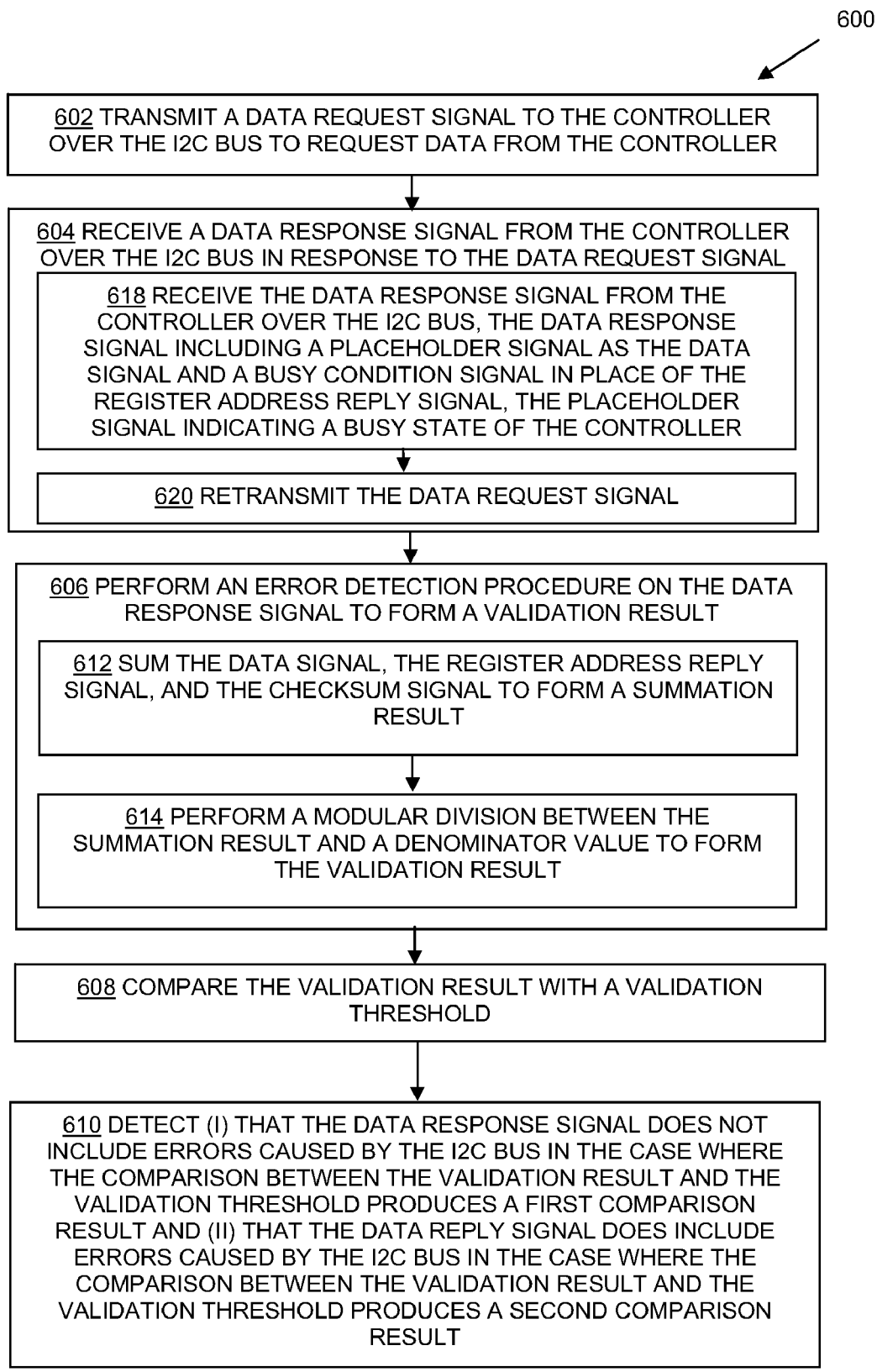
FIG. 6 illustrates a method for detecting a transmission error for data transferred over an I2C bus between a storage processor and a controller of the data storage system during a data read procedure.

FIG. 3 illustrates a series of signals 300 transmitted using the I2C bus 56, between a master device, such as the storage processor 24, and the controller 50 (e.g., slave device) during a data read procedure. Taken in conjuction with FIG. 3, FIG. 6 illustrates, in the storage processor 24, a flowchart 600 showing a method for detecting a transmission error for data transferred over an I2C bus between the storage processor 24 and the a controller 50. The storage processor 24 initially transmits a start signal such as a start bit 302 and a controller address signal such as a controller address byte 304 to the controller 50 to establish communications with the controller 50. In response, the controller 50 transmits an acknowledgement signal or bit 306 to the storage processor 24 to confirm reception of the controller address byte 204.

The storage processor 24 then transmits a data request signal to the controller 50 using the I2C bus 56 in order to obtain data from the controller's register 55 (FIG. 6, element 602). For example, the storage processor 24 transmits, as part of the data request signal, a register address request signal or byte 308 to the controller 50 indicating the address (e.g., location) of the register from which the storage processor 24 is requesting data. For example, as illustrated, the storage processor 24 transmits a register address request byte 308 indicating that the data to be provided to the controller 50 should be read from the register having an address of 0x01 (e.g., indicated in Table 1 as the system register 102). The controller 50 transmits, in response, an acknowledgement bit 310. Upon reception of the acknowledgement bit 210, the storage processor 24 then transmits a second start bit 311 and issues, as part of the data request signal, a second controller address signal or byte 318 to request a read from the controller 50. The controller 50 then provides a response to the data request signal.

For example, in one arrangement, the controller 50 provides an acknowledgement bit 320, along with a data response signal, to the storage processor 24. As illustrated in FIG. 3, in one arrangement, the data response signal includes a data signal 312 such as the data byte stored in the requested register, a register address reply signal or byte 350 that indicates the location or address of the register from which the data provided in the data byte 312 was taken, and a checksum signal or byte 316. While the checksum byte 316 can be calculated in a number of ways, in one arrangement, the controller 50 calculates the checksum byte 316 using the checksum calculation algorithm described above with respect to FIG. 2.

Returning to FIG. 3, once the storage processor 24 receives the data response signal (FIG. 6, element 604) the storage processor 24 utilizes the data signal 312, the register address reply signal 350, and the checksum byte 316 to engage in an error detection procedure to detect the presence of errors in the data signal 312 56 (FIG. 6, element 606) caused during transmission via the I2C bus. For example, the storage processor 24 first adds the checksum byte 316, the register address reply byte 350, and the data byte 312 to form a resultant sum (FIG. 6, element 612). The storage processor 24 then performs a modular division between the resultant sum and a denominator value, such as the value "256" to form a validation result 330 (FIG. 6, element 614). The storage processor 24 then compares the validation result 330 to a validation threshold 332(FIG. 6, element 608) to detect the presence of errors in the data byte 312. In one arrangement, the validation threshold 332 is set to the value "0x0A." In the case where the validation result 330 is equal to the validation threshold 232 (e.g., the validation result equals "0x0A"), as indicated in FIG. 6, element 610 the storage processor 24 detects a first comparison result indicating that the data byte 312 read from the controller via the I2C bus 56 has been received without errors (e.g., no flipped bits occurring in the data byte 312). In the case where the validation result 330 is not equal to the validation threshold 332 as indicated in FIG. 6, element 610 the storage processor 24 detects a second comparison result indicating that the data byte 312 transmitted from the controller 50 via the I2C bus 56 has been received with errors (e.g., flipped bits occurring in the data byte 312). As a result of such detection, in one arrangement, the storage processor 24 can attempt to re-read the data byte 312 from the controller 50.

In either a data write or a data read procedure, the error detection procedure allows the either the controller 50 or the storage processor 24, respectively, to detect the presence of errors in the data transmitted via the I2C bus 56. As described in the example above, the system 20 utilizes a checksum value when transmitting data with the existing I2C protocol of the system 20. By using the checksum value, the recipient of the data and checksum value, either the controller 50 or the storage processor can detect the present or absence of errors in the data. As such, the data storage system 20 allows error checking of data transmitted using the I2C protocol without requiring additional components (e.g., processors, caches, etc.) to be incorporated into the system 20. Therefore, the use of the error detection procedure described, in conjunction with the I2C protocol, does not add an additional expense to the system to provide data error checking and ensure data integrity.

As described above with respect to FIG. 3, the controller 50 and the storage processor 24 utilize the checksum value 316 to detect whether or not data transmitted or received via the I2C bus 56 includes errors (e.g., flipped bits in the data byte) as a result of the transmission. In certain cases, however, the I2C bus 56 can flip bits in the register address request byte 308. As a result of such bit flipping, the controller 50 can receive a register address request byte 308 that requests data from a register that is different than the register originally requested by the storage processor 24. As a result, the controller 50 can transmit a data byte to the storage processor 24 from the "wrong" register address. For example, assume the storage processor 24 transmits the register address request byte 308 to request data from the system register 102 (Table 1) of the controller 50. In the case where the I2C bus 56 flips a bit in the transmitted register request byte 308, the resultant register address request byte 308 can appear to the controller 50 as a request for data from the wrong register, such as the fault register 108 (Table 1). As a result, the controller 50 can read the data byte 312 from a different register than the storage processor 24 actually requested and transmit the incorrect data byte 312 to the storage processor 24.

While the storage processor 24 can utilize the checksum byte 316 in an error detection procedure, the procedure would not necessarily allow the storage processor 24 to detect reception of a data byte 312 from an incorrect register address. For example, in FIG. 3 the first blocks 304, 308, sent by the storage processor 24 are write blocks that indicate, to the controller 50, the address of the register from which the storage processor 24 wants to read. Assume, however, that the I2C bus 56 flips a bit in the register aggress signal 308 transmitted to the controller 50. After the second start block 311, the storage processor reads from the controller 50 to retrieve the requested data. The storage processor first receives the register address signal 350 that the controller 50 believes the storage processor 24 was requesting, followed by the data 312 and the checksum 316. In this case, when the storage processor 24 performs the error detection procedure the checksum 316 used in the procedure will be "correct" because it was based on a "bad" register address signal 350 that was not checksum'd during the write procedure.

In order to allow the storage processor 24 to detect whether the controller 50 has transmitted data from the requested register, as indicated in FIG. 3, the controller 50 transmits the register address reply byte 350 to the storage processor 24 as part of the error detection procedure. As indicated above, the register address reply byte 350 indicates the location in the register 55 from which the data provided in the data byte 312 was taken. For example, as illustrated in FIG. 3, the register address reply byte 350 indicates that the data in the data byte 312 was taken from register address "0x01" (e.g., the system register 102 as indicated in Table 1). When the storage processor 24 receives the register address reply byte 350, the storage processor 24 compares the byte 350 with the register address request byte 308 previously sent to the controller 50.

For example, in the case where the storage processor 24 detects that the register address reply byte 350 matches the register address request byte 308, the storage processor 24 detects that it has received the data from the requested register address. In the case where the storage processor 24 detects that the register address reply byte 350 does not match the register address request byte 308, the storage processor 24 detects that it has received the data byte 312 from an improper register address. Based on such detection, the storage processor 24 can attempt to re-read the data byte 312 from the controller 50. By utilizing the register address reply byte 350 in conjunction with the register address request byte 308, the controller 50 limits or prevents the storage processor 24 from performing unnecessary functions as a result of receiving data from a register that was not requested by the storage processor 24.

While the storage processor 24 and the controller 50 utilize the error detection procedure to detect errors in the data caused by the I2C bus 56, other data exchange conflicts can occur between the controller 50 and storage processor 24 over the I2C bus 56. For example, as indicated above with respect to FIG. 1, the controller 50 is operable to configure the VLAN associated with the switch 36 to create and isolate separate communications paths 42, 44 within the switch. When performing the configuration, the controller 50 enters a busy state. As such, while the controller 50 can service write requests transmitted from the storage processor 24 in the system 20, in one arrangement, the controller 50 cannot service read requests. Therefore, in order to allow the controller 50 to delay responding to the read request from the storage processor while maintaining communications with the storage processor 24, the controller 50 engages in a busy read transaction with the storage processor 24.

Figure 4:
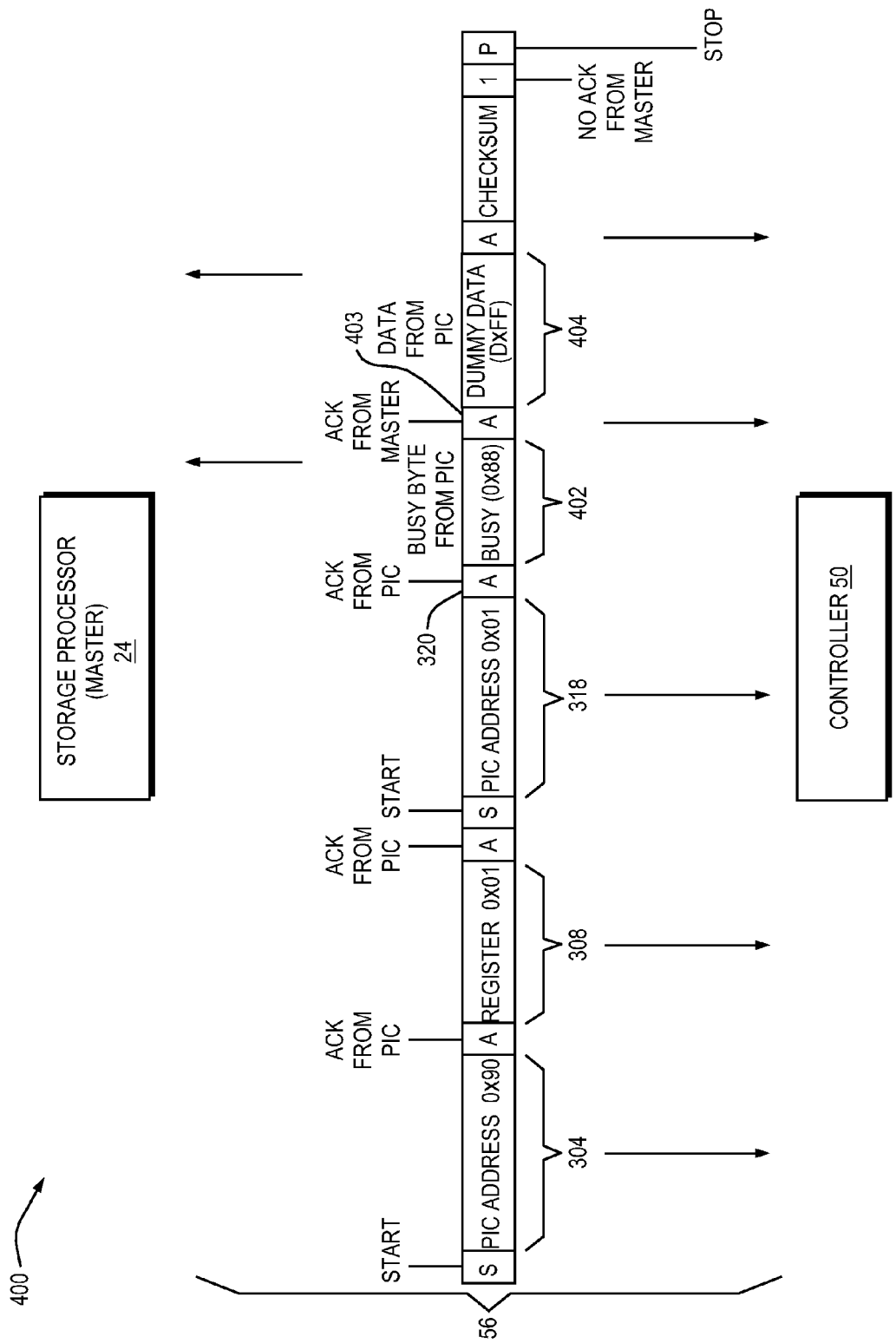
FIG. 4 illustrates a series of signals transmitted between a master device and a slave device in the data storage system of FIG. 1 during a data read procedure when the slave device is in a busy state, according to one embodiment of the invention.
Figure 5A:
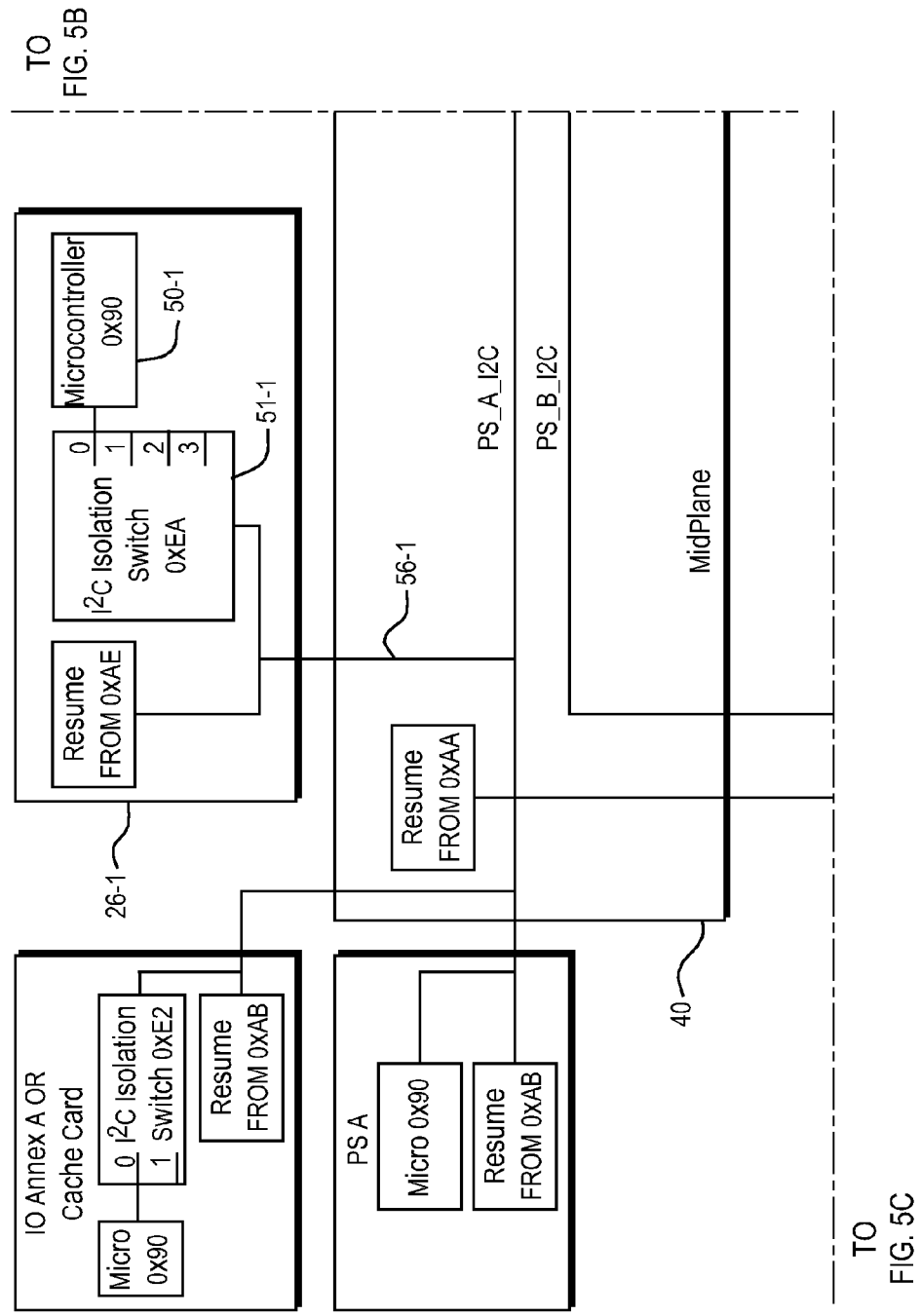
Figure 5B:
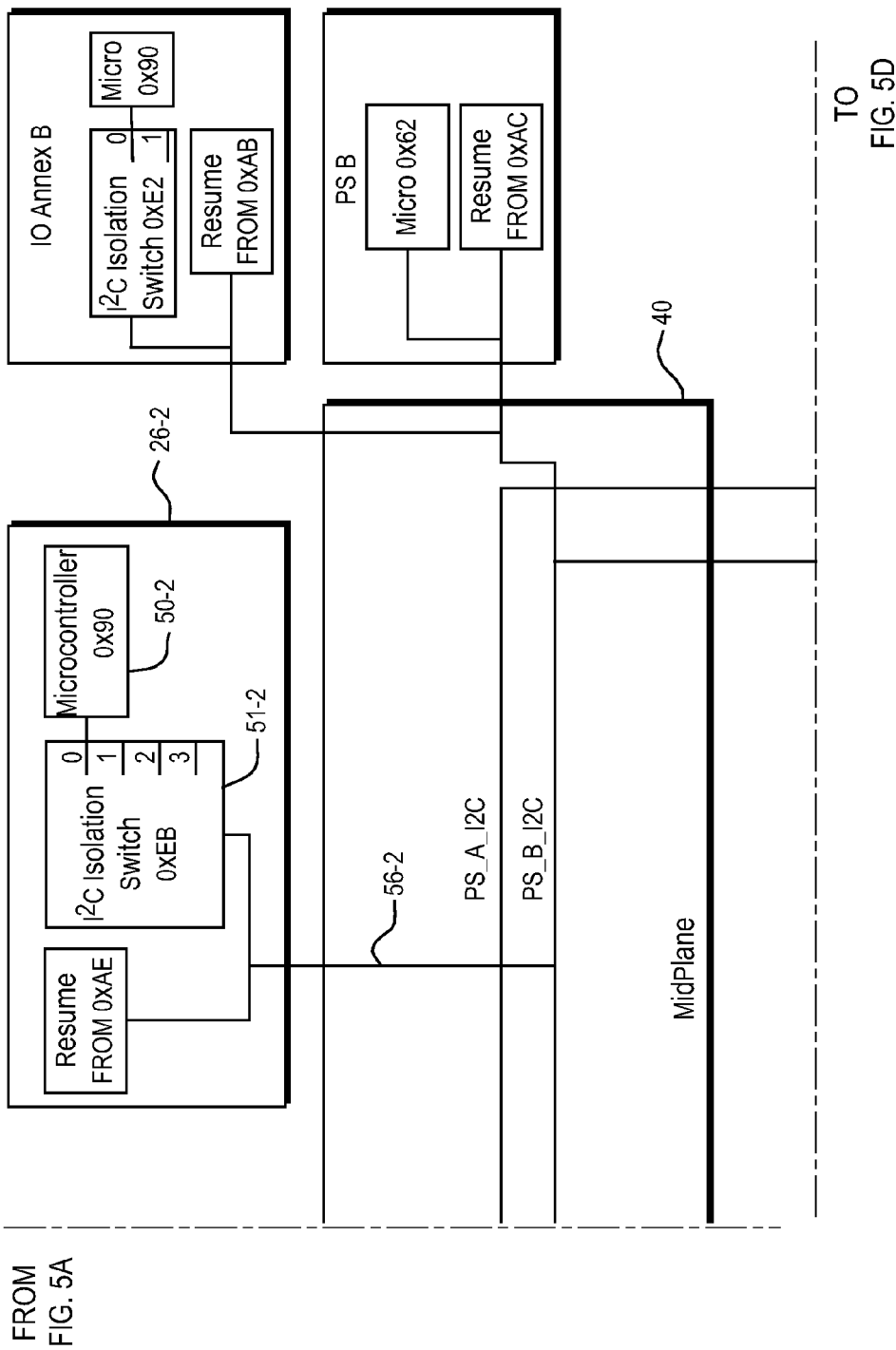
Figure 5C:
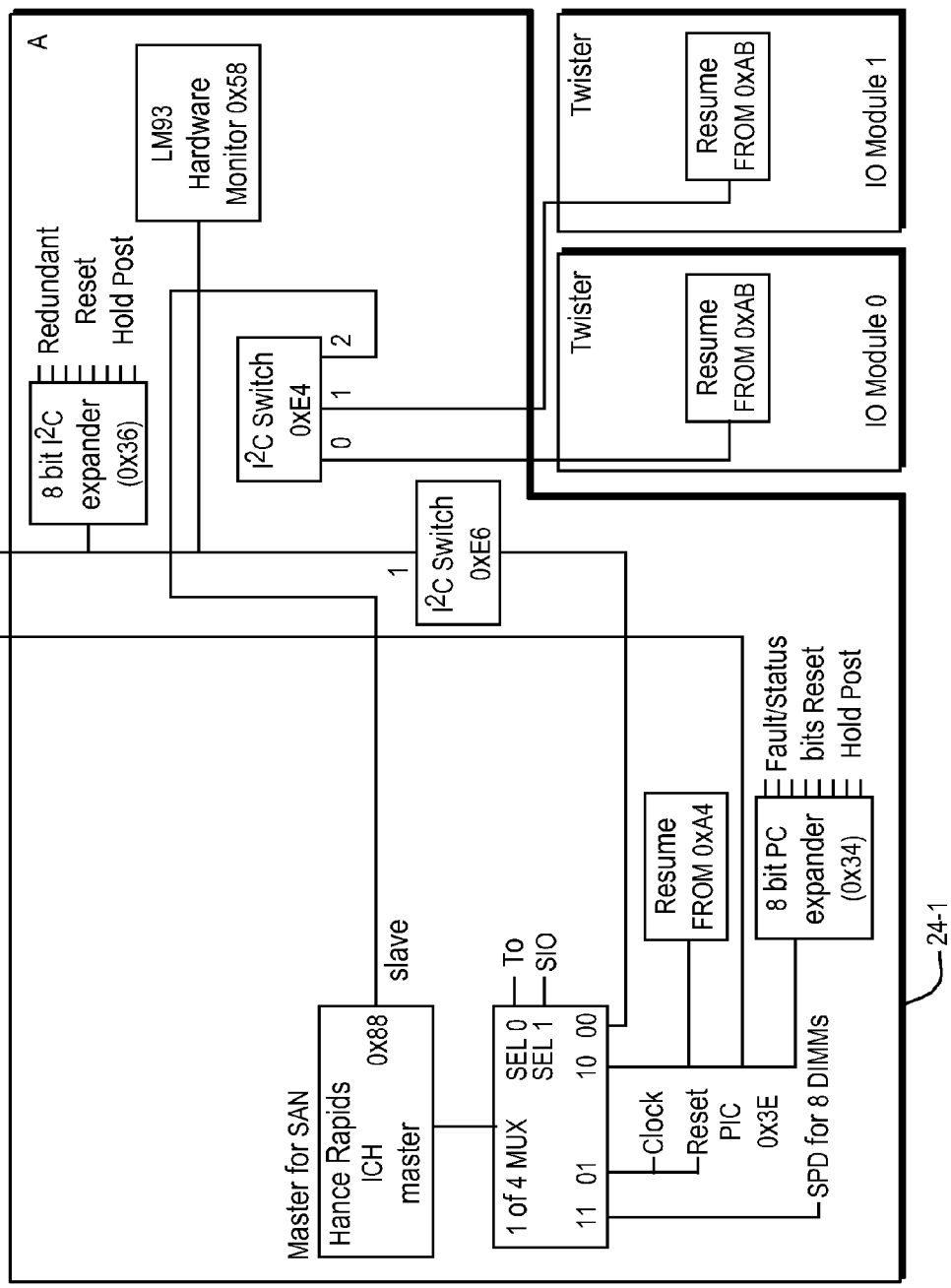

FIG. 4 illustrates the use of the busy read transaction during a data read procedure performed by the storage processor 24. As indicated above, during a data read, the storage processor 24 transmits the controller address byte 304, the register address request byte 308, and a reissued controller address byte 318 to the controller 50. In the event that the controller 50 is in the process of configuring the VLAN of the switch 36 (FIG. 1), the controller 50 transmits a busy condition indicator or byte 402 to the storage processor 24. For example, in one arrangement, the controller 50 transmits the busy condition byte 402 in place of the register address reply byte 350, shown in FIG. 3. The use of the busy condition byte 402 limits or prevents the controller 50 from transmitting invalid data, such as data taken from an unrequested register, to the storage processor 24 while the controller 50 is in the process of configuring the switch 36.

Returning to FIG. 4, in response to the busy condition byte 402, the storage processor 24 transmits an acknowledgement bit 403 to the controller 50. The controller 50, in turn, transmits a placeholder byte 404 to the storage processor 34 (FIG. 6, element 618). In one arrangement, the placeholder byte 404 includes a sequence of signals, such as a three byte sequence that indicates to the storage processor 24 that the controller 50 is busy. In one arrangement, the placeholder byte 404 also indicates a time duration after which the controller 50 will be available. For example, the placeholder byte 404 can indicate the controller's availability after the expiration of some duration of time, such as 30 milliseconds. Based upon the placeholder byte 404, the storage processor 24 can then retransmit the request to read data from the controller 50 (FIG. 6, element 620).

While this invention has been particularly shown and described with references to preferred embodiments thereof, it will be understood by those skilled in the art that various changes in form and details may be made therein without departing from the spirit and scope of the invention as defined by the appended claims.

For example, as described above, the system 20 uses a checksum signal to allow the controller 50 and storage processor 24 to detect errors in data transmitted between the devices 50, 24 over the I2C bus 56. Such description is by way of example only. In one arrangement, other types of error detection can be utilized in conjunction with the I2C protocol. For example, parity can be utilized with the I2C protocol as part of the error checking procedure.

With respect to the description above, the storage processor 24 is described as performing block read and write operations. As such, the storage processor operates as the master device. Such description is by way of example only. In one arrangement, the term "master" is used to represent the storage processor, 24, power source 25 (e.g., processor associated with the power source 25), or any other element 27, such as one or more cache cards 27-1, 27-2, shown in FIGS. 5A-5D, that communicate with the controllers 50-1, 50-2 using the I2C buses 56-1, 56-2, respectively.

Appendix

TABLE 1

Register Map

| REGISTER | | REGISTER ADDRESS (Hex Number) |
|---|---|---|
| 100 | Reserved | 0x00 |
| 102 | System Register (Read/Write) | 0x01 |
| 104 | Fault Register (Read/Write) | 0x02 |
| 106 | Port Status Register A (Read Only) | 0x03 |
| 108 | Port Status Register B (Read Only) | 0x04 |
| 110 | Manufacturing Mode Register (Write Only) | 0x05 |
| 112 | Boot Block Revision Register (Read Only) | 0x06 |
| 114 | Configuration Revision Register (Read Only) | 0x07 |

TABLE 2

System Register Bits Map

| | SYSTEM REGISTER BITS | DESCRIPTION |
|---|---|---|
| 120 | 7 | Reserved |
| 122 | 6 | Slot ID |
| 124 | 5 | External Enabled Manufacturing Mode |
| 126 | 4 | Software Enable Manufacturing Mode |
| 128 | 3 | Fault State |
| 130 | 2:0 | Switch Configuration Mode |

The invention claimed is:

1. In a storage processor of a data storage system, a method for detecting a transmission error for data transferred over an I2C bus between the storage processor and a controller of the data storage system during a data read procedure, comprising:

transmitting a data request signal to the controller over the I2C bus to request data from the controller;

receiving a data response signal from the controller over the I2C bus in response to the data request signal;

performing an error detection procedure on the data response signal to form a validation result;

comparing the validation result with a validation threshold; and detecting (i) that the data response signal does not include errors caused by the I2C bus in the case where the comparison between the validation result and the validation threshold produces a first comparison result and (ii) that the data reply signal does include errors caused by the I2C bus in the case where the comparison between the validation result and the validation threshold produces a second comparison result.

2. The method of claim 1, wherein:

receiving comprises receiving the data response signal from the controller over the I2C bus in response to the data request signal the data response signal including a data signal, a register address reply signal, and a checksum signal; and performing the error detection procedure comprises:

summing the data signal, the register address reply signal, and the checksum signal to form a summation result; and performing a modular division between the summation result and a denominator value to form the validation result.

3. The method of claim 2 wherein:

comparing the validation result comprises comparing the validation result with validation threshold, the validation threshold having a value of zero; and detecting comprises detecting (i) that the data response signal does not include errors caused by the I2C bus in the case where the comparison between the validation result and the validation threshold produces a comparison result equal to the validation threshold and (ii) that the data reply signal does include errors caused by the I2C bus in the case where the comparison between the validation result and the validation threshold produces a comparison result not equal to the validation threshold.

4. The method of claim 2, wherein:

transmitting comprises transmitting the data request signal to the controller over the I2C bus to request data from the controller, the data signal including a register address request signal that indicates the register to which the storage processor is writing;

performing further comprises comparing the register address request signal to the register address reply signal;

and detecting further comprises detecting (i) that the data response signal does not include errors caused by the I2C bus in the case where the register address request signal is equal to the register address reply signal and (ii) that the data reply signal does include errors caused by the I2C bus in the case where the register address request signal is not equal to the register address reply signal.

5. The method of claim 1, comprising:

in response to transmitting the data request signal, receiving the data response signal from the controller over the I2C bus, the data response signal including a placeholder signal as the data signal and a busy condition signal in place of the register address reply signal, the placeholder signal indicating a busy state of the controller; and retransmitting the data request signal.

6. The storage processor of claim 5, wherein the storage processor is configured to:
in response to transmitting the data request signal, receive the data response signal from the controller over the I2C bus, the data response signal including a placeholder signal as the data signal and a busy condition signal in place of the register address reply signal, the placeholder signal indicating a busy state of the controller; and
retransmit the data request signal.

7. A storage processor of a data storage system having a controller and I2C bus configured to provide communication between the storage processor and the controller, the storage processor configured to
transmit a data request signal to the controller over the I2C bus to request data from the controller;
receive a data response signal from the controller over the I2C bus in response to the data request signal;
perform an error detection procedure on the data response signal to form a validation result;
compare the validation result with a validation threshold; and
detect (i) that the data response signal does not include errors caused by the I2C bus in the case where the comparison between the validation result and the validation threshold produces a first comparison result and (ii) that the data reply signal does include errors caused by the I2C bus in the case where the comparison between the validation result and the validation threshold produces a second comparison result.

8. The storage processor of claim 7, wherein the storage processor is configured to:
when receiving, receive the data response signal from the controller over the I2C bus in response to the data request signal the data response signal including a data signal, a register address reply signal, and a checksum signal; and
when performing the error detection procedure:
sum the data signal, the register address reply signal, and the checksum signal to form a summation result; and
perform a modular division between the summation result and a denominator value to form the validation result.

9. The storage processor of claim 8, wherein the storage processor is configured to:
when comparing the validation result, compare the validation result with validation threshold, the validation threshold having a value of zero; and
when detecting, detect (i) that the data response signal does not include errors caused by the I2C bus in the case where the comparison between the validation result and the validation threshold produces a comparison result equal to the validation threshold and (ii) that the data reply signal does include errors caused by the I2C bus in the case where the comparison between the validation result and the validation threshold produces a comparison result not equal to the validation threshold.

10. The storage processor of claim 8, wherein the storage processor is configured to:
when transmitting, transmit the data request signal to the controller over the I2C bus to request data from the controller, the data signal including a register address request signal that indicates the register to which the storage processor is writing;
when performing, further compare the register address request signal to the register address reply signal; and
when detecting, further detect (i) that the data response signal does not include errors caused by the I2C bus in the case where the register address request signal is equal to the register address reply signal and (ii) that the data reply signal does include errors caused by the I2C bus in the case where the register address request signal is not equal to the register address reply signal.

11. In a controller of a data storage system, a method for detecting a transmission error for data transferred over an I2C bus between the controller and a storage processor of the data storage system during a data write procedure, comprising:
receiving a data transmission signal from the storage processor over the I2C bus, the data transmission signal initiating writing of data to the controller;
performing an error detection procedure on the data transmission signal to form a validation result;
comparing the validation result with a validation threshold; and
detecting (i) that the data transmission signal does not include errors caused by the I2C bus in the case where the comparison between the validation result and the validation threshold produces a first comparison result and (ii) that the data transmission signal does include errors caused by the I2C bus in the case where the comparison between the validation result and the validation threshold produces a second comparison result.

12. The method of claim 11, wherein:
receiving comprises receiving the data transmission signal from the storage processor over the I2C bus, the data transmission signal including a data signal, a register address request signal, and a checksum signal; and
performing the error detection procedure comprises:
summing the data signal, the register address request signal, and the checksum signal to form a summation result; and
performing a modular division between the summation result and a denominator value to form the validation result.

13. The method of claim 12 wherein:
comparing the validation result comprises comparing the validation result with validation threshold, the validation threshold having a value of zero; and
detecting comprises detecting (i) that the data transmission signal does not include errors caused by the I2C bus in the case where the comparison between the validation result and the validation threshold produces a comparison result equal to the validation threshold and (ii) that the data transmission signal does include errors caused by the I2C bus in the case where the comparison between the validation result and the validation threshold produces a comparison result not equal to the validation threshold.

14. The method of claim 12, wherein receiving comprises receiving the data transmission signal from the storage processor over the I2C bus, the data transmission signal including a configuration characteristic signal, a register address request signal, and a checksum signal; and
in response to detecting that the configuration characteristic signal does not include errors caused by the I2C bus, configuring a switch coupled to the controller to provide communication pathways between a first set of ports associated with the controller and a second set of ports associated with the storage processor based upon the configuration characteristic signal.

15. A controller of a data storage system having a storage processor and I2C bus configured to provide communication between the controller and the storage processor, the controller configured to:

receive a data transmission signal from the storage processor over the I2C bus, the data transmission signal initiating writing of data to the controller;

perform an error detection procedure on the data transmission signal to form a validation result;

compare the validation result with a validation threshold; and detect (i) that the data transmission signal does not include errors caused by the I2C bus in the case where the comparison between the validation result and the validation threshold produces a first comparison result and (ii) that the data transmission signal does include errors caused by the I2C bus in the case where the comparison between the validation result and the validation threshold produces a second comparison result.

16. The controller of claim 15, wherein:

when receiving, the controller is configured to receive the data transmission signal from the storage processor over the I2C bus the data response signal including a data signal, a register address request signal, and a checksum signal; and when performing the error detection procedure, the controller is configured to:

sum the data signal, the register address request signal, and the checksum signal to form a summation result; and perform a modular division between the summation result and a denominator value to form the validation result.

17. The controller of claim 16, wherein:

when comparing the validation result, the controller is configured to compare the validation result with validation threshold, the validation threshold having a value of zero; and when detecting, the controller is configured to detect (i) that the data transmission signal does not include errors caused by the I2C bus in the case where the comparison between the validation result and the validation threshold produces a comparison result equal to the validation threshold and (ii) that the data transmission signal does include errors caused by the I2C bus in the case where the comparison between the validation result and the validation threshold produces a comparison result not equal to the validation threshold.

18. The controller of claim 16, wherein when receiving, the controller is configured to receive the data transmission signal from the storage processor over the I2C bus the data transmission signal including a configuration characteristic signal, a register address request signal, and a checksum signal; and in response to detecting that the configuration characteristic signal does not include errors caused by the I2C bus, the controller is configured to configure a switch coupled to the controller to provide communication pathways between a first set of ports associated with the controller and a second set of ports associated with the storage processor based upon the configuration characteristic signal.

* * * * *

UNITED STATES PATENT AND TRADEMARK OFFICE
CERTIFICATE OF CORRECTION

| | | |
|---|---|---|
| PATENT NO. | : 7,502,992 B2 | Page 1 of 1 |
| APPLICATION NO. | : 11/394919 | |
| DATED | : March 10, 2009 | |
| INVENTOR(S) | : Phillip Leef et al. | |

It is certified that error appears in the above-identified patent and that said Letters Patent is hereby corrected as shown below:

In the Title, item (54); "METHOD AND APPARATUS FOR DETECTING PRESENCE OF ERRORS IN DATA TRANSMITTED BETWEEN COMPONENTS IN A DATA STORAGE SYSTEM USING AN I2C PROTOCOL"
should read -- METHOD AND APPARATUS FOR DETECTING THE PRESENCE OF ERRORS IN DATA TRANSMITTED BETWEEN COMPONENTS IN A DATA STORAGE SYSTEM USING AN I2C PROTOCOL --.

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,502,992 B2  Page 1 of 1
APPLICATION NO. : 11/394919
DATED : March 10, 2009
INVENTOR(S) : Phillip Leef et al.

It is certified that error appears in the above-identified patent and that said Letters Patent is hereby corrected as shown below:

Title Page, Item (54) and Column 1, lines 1-5,
In the Title; "METHOD AND APPARATUS FOR DETECTING PRESENCE OF ERRORS IN DATA TRANSMITTED BETWEEN COMPONENTS IN A DATA STORAGE SYSTEM USING AN I2C PROTOCOL"
should read -- METHOD AND APPARATUS FOR DETECTING THE PRESENCE OF ERRORS IN DATA TRANSMITTED BETWEEN COMPONENTS IN A DATA STORAGE SYSTEM USING AN I2C PROTOCOL --.

This certificate supersedes the Certificate of Correction issued April 14, 2009.

Signed and Sealed this

Fifth Day of May, 2009

JOHN DOLL
*Acting Director of the United States Patent and Trademark Office*